United States Patent

Price et al.

[15] 3,659,272

[45] Apr. 25, 1972

[54] DIGITAL COMPUTER WITH A PROGRAM-TRACE FACILITY

[72] Inventors: William Chandler Price, Pasadena; Stephen Lane Billard, San Gabriel, both of Calif.

[73] Assignee: Burroughs Corporation, Detroit, Mich.

[22] Filed: May 13, 1970

[21] Appl. No.: 36,716

[52] U.S. Cl. ..........340/172.5

[51] Int. Cl. ..........G06f 11/04, G06f 9/18

[58] Field of Search ..........340/172.5; 235/153

[56] References Cited

UNITED STATES PATENTS

| | | | |
|---|---|---|---|
| 3,548,384 | 12/1970 | Barton et al. | 340/172.5 |
| 3,415,981 | 12/1968 | Smith et al. | 235/153 |
| 3,509,541 | 4/1970 | Gordon | 340/172.5 |
| 3,286,239 | 11/1966 | Thompson et al. | 340/172.5 |
| 3,518,413 | 6/1970 | Holtey | 235/153 |
| 3,366,929 | 1/1968 | Mullery et al. | 340/172.5 |
| 3,348,211 | 10/1967 | Ghiron | 340/172.5 |
| 3,213,427 | 10/1965 | Schmitt et al. | 340/172.5 |
| 3,551,659 | 12/1970 | Forsythe | 235/153 |
| 3,286,236 | 11/1966 | Logan et al. | 340/172.5 |
| 3,492,654 | 1/1970 | Fresch et al. | 340/172.5 |

*Primary Examiner*—Paul J. Henon
*Assistant Examiner*—Jan E. Rhoads
*Attorney*—Christie, Parker & Hale

[57] ABSTRACT

There is described a computer system in which execution of each instruction or operator of a program procedure may result in an interrupt condition depending upon the condition of a trace bit of a program control word associated with the procedure. The interrupt causes a trace interrupt procedure to be initiated by which a program trace is recorded for the particular instruction. Entry into another procedure causes the trace bit to be stored and a new trace bit established for the new procedure being entered.

4 Claims, 1 Drawing Figure

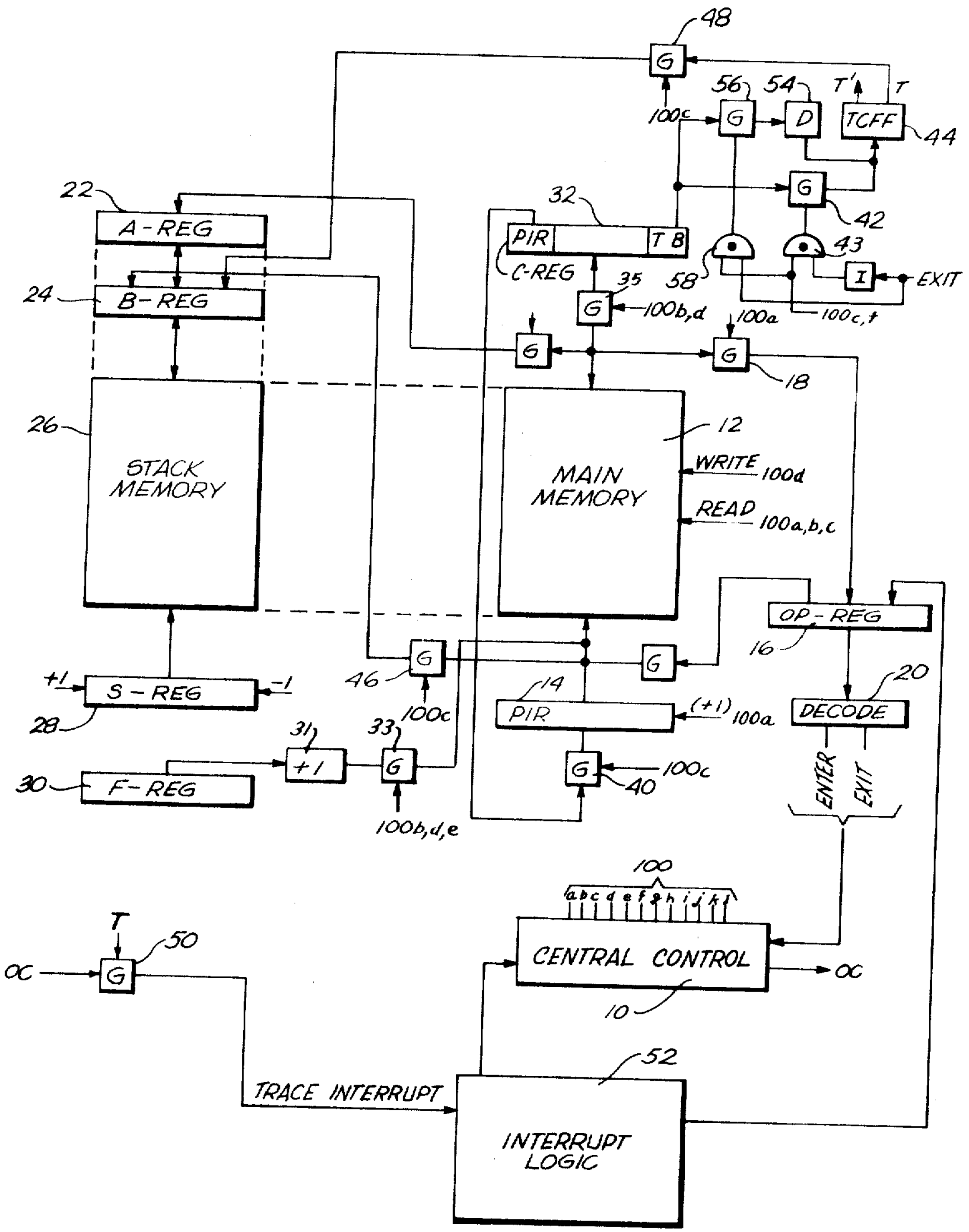
INVENTORS.
WILLIAM CHANDLER PRICE
STEPHEN LANE BILLARD
BY
Christie, Parker & Hale
ATTORNEYS

DIGITAL COMPUTER WITH A PROGRAM-TRACE FACILITY

FIELD OF THE INVENTION

This invention relates to electronic digital computers and, more particularly, is concerned with a method and apparatus for recording a program trace of the flow of a program as it is executed by the computer.

BACKGROUND OF THE INVENTION

The use of a program trace is a useful tool in program debugging and in diagnosis of hardware failure of a digital processor. A program trace provides a printed listing of the condition of various registers and control flip-flops at predetermined times in the flow of a program, such as at the termination of the execution of each instruction or operator of the program. A program trace has heretofore been implemented in several ways. One technique has been by simulation. Simulation involves writing a program which accepts as data, the program being traced. The simulation program interpretes the instructions of the program being traced and programmatically simulates the behavior of the hardware of the processor being simulated. The difficulty with this technique is that the simulation program must duplicate, usually at a very slow rate, what the simulated hardware would do very quickly. Obviously the more complex the hardware, the more complex the simulation program must be and the longer it takes to run. The simulation program of course only simulates the intent of the hardware and cannot duplicate design flaws or hardware malfunctions.

Another technique for implementing a program trace is to run the program being traced on the computer and allowing the hardware to execute the instructions in the normal manner. The trace operation is accomplished then by inserting each of the instructions being traced in a trace program so that each instruction is followed by a group of special instructions which function solely to record and print out the flow of the program. This approach is difficult, if not impossible, in any machines which include instructions which produce a change of control environment, such as branch instructions, interrupt conditions, or the like. Also the design of the software system for large computer systems prohibits code modification to implement trace operations.

SUMMARY OF THE INVENTION

The present invention is directed to an arrangement for tracing the flow of a computer program during selected program procedures. Each program procedure contains a number of different operators or instructions which, in sequence, control the operation of the data processing system. Each procedure has associated with it a Program Control Word which is interrogated whenever there is an entry into a program procedure. At least one bit in the Program Control Word is used to indicate whether or not the procedure is to operate in a trace mode in which the completion of each operation causes entry into an interrupt procedure for recording the flow of the program. The trace bit is stored in a control flip-flop. Whenever the trace bit is on and an operation is completed, a Trace interrupt is initiated. Whenever a new procedure is entered, a Return Control Word stores the status of the Trace bit and the Trace bit flip-flop is re-set in response to the Program Control Word of the new procedure being entered. On exiting the new procedure and returning to the prior procedure, the Trace bit in the Return Control Word is interrogated and the control flip-flop is re-set accordingly.

BRIEF DESCRIPTION OF THE DRAWING

For a more complete understanding of the invention reference should be made to the accompanying drawing which is a schematic block diagram of a portion of a processor incorporating the features of the present invention.

DETAILED DESCRIPTION OF THE PREFERRED EMBODIMENT

While not limited to a specific type of processor, the present invention in its preferred embodiment has particular application to a processor of the type described in copending application Ser. No. 672,042, filed Oct. 2, 1967, and assigned to the same assignee as the present invention, now issued as U.S. Pat. No. 3,548,384. This application, entitled "Procedure Entry For a Data Processor Employing a Stack", describes an arrangement in which a Program Control Word is used to enter a new or at least a different program procedure. A Program Control Word contains a number of different items of information, including an address which points to the location in memory where a series of operators making up the new procedure are stored. This address field is referred to as the PIR field. The Program Control Word contains other fields and control bits necessary to entry into a new procedure. According to the present invention, there is provided a Trace bit in the Program Control Word which indicates whether or not a program trace is to be initiated for that procedure. If the Trace bit is 0, it indicates that the operation proceeds normally. However, if the Trace bit is a 1, it indicates that the trace mode is to be initiated. In the trace mode, the completion of each operator or instruction of the program is followed by a Trace interrupt procedure.

As further described in more detail in the above-identified application, whenever entering a new procedure, a Return Control Word is generated and stored which is used to identify the prior procedure to which the data processing system is to return after having completed execution of the new procedure being entered. The Return Control Word contains all of the information required to set up the registers in the processor to the state they were in when execution of the procedure was interrupted to enter the new procedure. Thus the Return Control Word includes a PIR field which is an address pointing to the next operator of the series of operators stored in memory for the prior procedure being executed at the time of entering the new procedure. The Return Control Word also includes a Trace bit which indicates whether the prior procedure was in the trace mode at the time entry was made into the new procedure.

Referring to the drawing in detail, the numeral 10 indicates generally the central control of the processor which by means of a sequence counter and appropriate control logic controls the processor to execute the various operators or instructions designed into the hardware of the processor. The central control unit, in a conventional manner, activates during successive clock intervals selected ones of a plurality of control lines **100*a*, 100*b*, etc. going to various gates, registers, and other elements in the processor by which the processor is controlled in its operation. The output lines that are activated and the sequence in which they are activated is determined by the design of the control logic in central control in response to an operator or instruction, as hereinafter described in more detail. The processor further includes a main memory 12 which preferably is an addressable high-speed core memory. Data is stored in the memory in the form of words which can be read out or written in, in response to control signals applied respectively to a Write input and a Read input. The address in the memory 12 at which information is read or written is determined by an address applied to the memory from any one of a number of registers, including a PIR register 14**. The PIR register normally contains the address of the next operator in the program procedure being executed.

During the normal fetch operation as controlled by the central control 10 through output line **100*a* applied to the Read input of the main memory, the operator is read out of the main memory from the address indicated by the PIR register 14 and placed in an OP-register 16 through a gate 18, also activated by the control line 100*a* from the central control 10. The PIR register 14 is then counted up one point to the next operator in the program procedure in response to the control line 100*a*. A decoder 20 decodes the contents of the OP register 16 to provide an indication of the type of operation required. For the purpose of the present description two operators are of particular interest, the Enter operator by which entry to a new procedure is initiated, and an Exit operator by which a return to the prior procedure is initiated. The output of the decoder 20 is applied to the central control 10. Logic in the central control (not shown) in combination with a conventional sequence counter, activates particular ones of control lines 100** in the desired sequence to control the processor in the required manner to execute the particular operation called for. Both of these operators are described in more detail in the above-identified patent.

The processor further includes a stack memory which operates in conventional manner as a first-in, last-out type of storage. The stack memory includes two hard registers, referred to as the A-register 22 and B-register 24. The stack memory further includes a core memory section which is preferably part of the main memory 12, but which for convenience is indicated separately at 26. An S-register 28 normally points to the address location of the last word to be transferred to the core memory portion of the stack. Normally words are placed in the stack by transferring them to the A-register 22. The word already in the A-register 22 is at the same time transferred to the B-register 24 while the word in the B-register 24 is transferred to the top of the stack memory 26 at a location identified by the S-register 28. Similarly, when a word is read out of the stack, it is read out from the A-register 22 and the stack is adjusted by transferring the word in the B-register 24 to the A-register 22 and reading out the last word from the top of the stack memory 26 from the location identified by the S-register 28. The S-register is either counted up 1 or counted down 1, as words are added to or removed from the stack.

As pointed out in more detail in the above-described patent, a number of stacks may be provided which share the A-register 22 and the B-register 24. Each program procedure may have its own stack in which words of information are stored, as well as operands and various types of reference and control words. The base address of the stack in memory for the particular procedure is stored in an F-register 30. The base location of the stack for the particular procedure contains a Mark Stack Control word which links it with the base address of another stack.

In addition to the A and B registers which are linked to the stack, there is provided a C-register 32 which is used for temporary storage of control words, descriptors, and the like, as they read out of main memory.

Change of procedures requires several operations. First, a Mark Stack Control Word is stored in the top of the stack. The contents of the F-register is stored as part of this control word, and the F-register is re-set to the same value as the S-register. Thus a new stack is started for the new procedure being entered. Various parameters, including an indirect reference word, are then loaded in the new stack above the Mark Stack Control Word.

Actual entry into the new procedure is then initiated by an Entry operator. When such an operator is placed in the OP register 16 by the above-described operation of control line **100*a* from the central control 10 and decoded by the decoder 20, the central control 10 is placed in a control state 100*b* during which the new address in the F-register 30 plus one is used to read out the indirect reference word in the stack which in turn is used as an address for causing a Program Control Word to be selected and read out of the main memory 12 into the C-register 32. To this end the contents of the F-Register 30 is incremented by one by the circuit 31 and gated by a gate 33 to the main memory 12 during the 100*b* state of the central control 10. A memory Read is performed and the desired word placed in the C-register 32 through a gate 35. This operation corresponds to Phase I of the Enter operator as described in detail in U.S. Pat. No. 3,548,384 and only summarized here. The central control 10 then advances to the next phase of the execution of the Enter operator in which Program Control Word in the C-register 32 has a PIR field transferred to the PIR register 14 through a gate 40 activated by the central control 10 during the 100*c*** state. In this manner a Program Control Word is used to enter the starting address of a string of operators stored in main memory for the new procedure.

Also during the **100*c* state of the central control, the Trace bit TB stored in the Program Control Word now in the C-register 32 is transferred by a gate 42 to a trace control flip-flop TCFF indicated at 44. The gate 42 is controlled by an AND circuit 43 which senses that the central control 10 is in the 100*c* state and that the Exit operator is not present in the OP-Reg 16, as provided by the output of an inverter I to which the EXIT line from decoder 20 is applied. Depending upon whether the Trace bit is off or on, the trace control flip-flop 44 sets an output line T to an "off" or "on" level, indicating either a normal mode of operation or a trace mode of operation, respectively. Simultaneously with transferring the contents of the C-register 32 to the PIR register 14 and the TCFF flip-flop 44, the prior contents of the PIR register 14 and the prior state of the TCFF flip-flop 44 are transferred respectively by gates 46 and 48 to the B-register 24, together with other information necessary to generate a Return Control Word in the B-register. The Return Control Word is then stored in the stack memory at the same location from which the indirect reference word was read out, as indicated by the F-register 30 plus one, by doing a Memory Write during 100*d*. The above steps effected by the 100*c* and 100*d* states of the central control 10** correspond to Phase II of U.S. Pat. No. 3,548,384, with the addition of the trace bit setting of TCFF and storing of the prior trace bit in the Return Control Word.

At the completion of the execution of the Enter operator, the central control 10 generates an Operation Complete (OC) signal. This causes the central control 10 to return to the **100*a* state and the fetch operation in which the next operator, now the first operator of the new procedure identified by the contents of the PIR register 14, is read out of main memory 12 and stored in the OP register 16**.

The setting of the TCFF flip-flop 44 determines whether the new procedure is to operate in the trace mode in which a Trace interrupt is initiated after the completion of each operator. This is accomplished by a gate 50 to which the OC generated by the central control 10 on the completion of an operation is applied together with the output T of the TCFF flip-flop 44. The output of the gate 50 thus passes the OC signal when the TCFF flip-flop is turned on, indicating a trace mode is required. The output of the gate 50 is applied to a Trace interrupt input of an interrupt logic circuit 52. The manner in which interrupts are processed and the methods whereby the central control 10 handles interrupts are well known in the computer art and a specific description thereof is not believed necessary for the purpose of understanding the present invention. Suitable arrangement for recognizing an Interrupt condition and initiating a special routine to enable the processor the handle the Interrupt condition is fully described, for example, in U.S. Pat. No. 3,492,654; In general, however, the interrupt logic 52 in response to the Trace interrupt signal, together with the central control 10, causes the processor to enter a trace interrupt procedure, also stored in the main memory 12, by generating through the hardware of the logic circuit 52 an Enter operator in the OP register 16. The interrupt logic 52, in response to a signal on the Trace Interrupt line, resolves priority with other interrupt conditions present, as described in U.S. Pat. No. 3,286,236 and if the Trace interrupt has priority, adjusts the stack and forces the code of the Enter operator into the OP Register 16. Execution of the Enter operator by central control again causes a new address to be placed in the PIR register 14 by means of the Program Control Word in the interrupt procedure and causes a Return Control Word to be generated and loaded into the stack in the same manner as the Enter operator described above. However, the TCFF flip-flop is turned off by the Program Control Word associated with the interrupt procedure so that there is no trace mode initiated as to the operators executed in the interrupt procedure. The operators or instructions executed during the Trace interrupt procedure may be programmed to cause a print-out or listing of changes in the stack memory or particular registers within the processor resulting from the execution of the operator in the program procedure being traced. The Trace Interrupt procedure may be modified according to the trace requirements in debugging the computer or attempting to test the operation of the hardware of the computer.

Any program procedure, including an interrupt procedure, is terminated by an Exit operator or a Return operator. See U.S. Pat. No. 3,548,384. Both operators cause the processor to return to the point in the prior procedure established by the Return Control Word. In other words, the Enter operator causes a shift from one procedure to another and the Exit operator causes a return to and continuation of the prior procedure.

Assuming that an Exit operator has been placed in the OP register 16 by the normal fetch procedure of the state 100*a* of the central control 10, the central control unit 10 in response to the Exit line from the decoder 20 is set to the 100*e* state in which the contents of the F-register 30 plus one is used to address and read the Return Control Word and read generated earlier by the Enter operator, from memory location F + 1 into the C-register 32. The address of the next operator in the prior procedure, stored in the PIR field of the Return Control Word in the G-Register, is transferred to the PIR register 14 through the gate 40 during the 100*f* state. The Trace bit in the TB field of the Return Control Word stored in the C-register 32 is transferred to the TCFF flip-flop 44 through a delay circuit 54 by a gate 56. The gate 56 is controlled by the output of an AND circuit 58 in response to the control line 100*f* from the central control 10 and the Exit line from the decoder 20. The purpose of the delay 54 is to delay the setting of the TCFF flip-flop 44 until after the generation of the OC pulse at the end of the execution of the Exit operator by the central control 10. This prevents a Trace interrupt being generated by the output of the gate 50 at the completion of an Exit operator when the Return Control Word trace bit is on. Otherwise the Exit operator at the end of a Trace interrupt procedure might result in re-entry of the Trace interrupt procedure.

One of the advantages of the above-described trace mode operation is that a full trace can be controlled dynamically by the program being traced. This can be accomplished by arranging the program being traced to enter a program procedure which modifies the Trace bit in its Return Control Word. Thus when the procedure being traced is re-entered, the setting of the trace control flip-flop 44 can be modified by the changed condition of the Trace bit in the Return Control Word. The above arrangement can also be modified to provide a Trace interrupt only following a procedure Entry operator and an Exit operator. This may be accomplished by having the Trace bit on in the Program Control Word for each of the Program Control Words except the Program Control Word associated with the Trace interrupt procedure. The Trace interrupt procedure is programmed to turn off the Trace bit in its Return Control Word and to turn on the Trace bit of the prior program procedure. By turning off the Trace bit in its Return Control Word, the Trace interrupt procedure causes the TCFF flip-flop 44 to be turned off when exiting from the Trace interrupt procedure. By turning on the Trace bit in the Return Control Word of the prior procedure, a Trace interrupt is generated on exiting from the new procedure. In this manner every Enter operator and Exit operator produces a Trace interrupt that none of the other operators in either the prior procedure or the new procedure produces.

From the above description it will be recognized that a programmer and maintenance technician are provided with a trace facility which can be dynamically controlled so as to apply full trace to selected procedure or to modify the trace during any procedure. Since the trace mode can be limited to a single procedure environment, no extra software effort is required to support a program trace in a multi-programming, multi-processor system.

What is claimed is:

1. In a multi-program data processing system having a memory for storing a plurality of program procedures, the last of which is an exiting operator to effect a return of system control to a prior procedure, said operators within each procedure being transferred out of memory and executed in their stored sequence by the processing system, said plurality of procedures comprising at least one procedure which contains an entering operator to effect a transfer of system control to a new procedure, and further comprising a trace interrupt procedure adapted to record the current status of selected system operating conditions, the method of tracing the flow of any particular program procedure comprising the steps of:
storing in memory for each procedure a Program Control Word which indicates if a trace operation is to be performed on its associated procedure,
executing a given procedure containing an entering operator,
entering a new procedure in response to execution of said entering operator in said given procedure,
generating and storing a Return Control Word upon entering the new procedure,
reading from memory the Program Control Word associated with the procedure being entered,
setting a trace control unit "off" or "on" in response to the status of the trace operation indicated by the Program Control Word associated with the procedure being entered,
setting the control condition of the Return Control Word to indicate if the trace control unit was "on" or "off" prior to its setting in response to the Program Control Word of the procedure being entered,
sequentially executing the program operators of the new procedure,
executing a trace interrupt porcedure upon the completion of execution of each program operator within the new procedure if the trace control unit is "on",
returning from the new procedure back to said given procedure in response to execution of the exiting operator at the end of the new procedure,
reading out from memory the Return Control Word associated with said given procedure, and
setting the trace control unit "off" or "on" in response to the status of the trace operation indicated by the control condition of the Return Control Word.

2. The method of claim 1 wherein the step of executing a trace interrupt procedure further comprises the steps of:
setting the trace control unit "off" when the trace interrupt procedure is entered, and
resetting the trace control unit "on" upon the completion of execution of the trace interrupt procedure.

3. The method of claim 1 wherein the step of executing a trace interrupt procedure further comprises the steps of:
generating and storing a Return Control Word indicating the status of the trace control unit at the time of entry into the trace interrupt procedure, and
setting said last-mentioned Return Control Word to indicate an "off" condition for the trace control unit.

4. The method of claim 3 wherein the step of executing a trace interrupt procedure further comprises the steps of:
reading out from the memory the Return Control Word generated at the time of entry into the trace procedure, and
setting the Return Control Word to indicate an "on" condition for the trace control unit.

* * * * *